No. 661,061. Patented Nov. 6, 1900.
J. A. LIDBACK.
STEAM ENGINE CYLINDER.
(Application filed Dec. 9, 1899.)

(No Model.)

Witnesses:
L. M. Godfrey
Benj. G. Ward

Inventor:
John A. Lidback
by S. W. Bates
his Atty.

UNITED STATES PATENT OFFICE.

JOHN A. LIDBACK, OF PORTLAND, MAINE.

STEAM-ENGINE CYLINDER.

SPECIFICATION forming part of Letters Patent No. 661,061, dated November 6, 1900.

Application filed December 9, 1899. Serial No. 739,853. (No model.)

*To all whom it may concern:*

Be it known that I, JOHN A. LIDBACK, a citizen of the United States of America, and a resident of Portland, Cumberland county, State of Maine, have invented certain new and useful Improvements in Steam-Engine Cylinders, of which the following is a specification.

My invention relates to cylinders for steam-engines; and the object of the invention is to construct a cylinder which will not require lubrication. The oil which is now commonly used to lubricate the cylinders of steam-engines becomes a source of great annoyance and inconvenience when the steam is condensed, particularly in compound engines, where the condensed steam is returned to the boiler. To overcome this difficulty and to save the expense of lubricating the cylinder is the purpose of my invention.

The invention consists in applying to the interior of the cylinder a hardened-steel lining or bushing, preferably in the form of rings which are placed side by side with abutting edges. The rings are hardened and smoothly finished, and in connection with a hardened piston they will wear indefinitely with a slight friction and no lubrication.

I have illustrated my invention by means of the accompanying drawings, in which—

Figure 1:
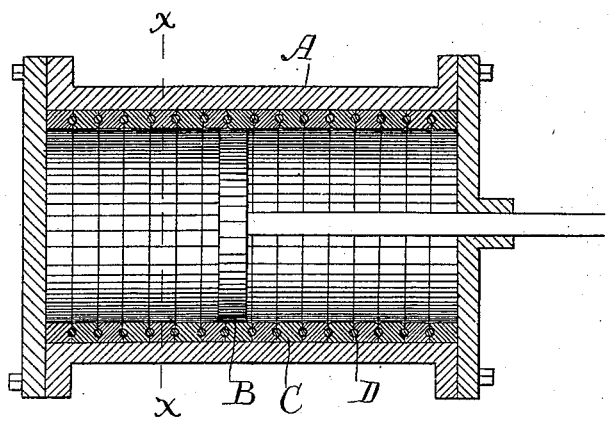
Figure 2:
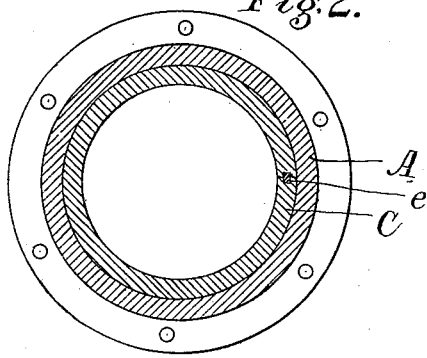
Figure 3:
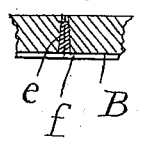

Figure 1 represents a vertical longitudinal section through a steam-cylinder provided with my lining. Fig. 2 is a cross-section taken on the line $x\ x$ of Fig. 1; and Fig. 3 is a sectional view taken through one of the rings, showing a method of tightening.

A represents the cylinder proper, and B B are the hardened-steel lining rings or bushings, which are put in the cylinder side by side to form a complete lining. These rings are hardened steel and are ground to a perfectly true surface before being placed in the cylinder. The lining-rings are connected together by connecting-rings D, which fit into grooves $f$, formed in adjacent edges of the rings.

Means are provided for slightly expanding the lining-rings D after they are put in the cylinder. As here shown, I abut the two ends of the ring together and form in these abutting ends a tapering groove in which fits a wedge $e$. When this wedge is driven in, it slightly expands the ring, and so holds it firmly in place. The rings may thus be fitted loosely to the cylinder, so that they slide into place easily, and after they are in the wedges may be driven in to hold them, as described. The inner corners of the rings are rounded off, so as to form V-shaped grooves between the rings.

The piston and its packing-rings being made of hardened-steel surfaces running together, create little friction and need no lubrication. The V-shaped grooves entrap the wet steam and enable it to provide lubrication for the piston. Although I have shown means for expanding the rings, they may be put in whole if fitted with sufficient accuracy. The rings may be accurately ground after they are in place in the cylinder or before they are put in, as desired.

I claim—

1. The herein-described steam-engine cylinder having a lining composed of a series of contiguous hardened rings throughout its entire length, combined with a piston.

2. The herein-described steam-engine cylinder having a lining composed of hardened-steel rings placed side by side and having annular grooves in their adjacent edges combined with connecting-rings adapted to fit into said grooves.

3. The herein-described steam-engine cylinder having a lining of hardened-steel rings placed side by side, the inner edges of said rings being rounded or cut away to form V-shaped internal grooves between the rings.

JOHN A. LIDBACK.

Witnesses:
S. W. BATES,
L. M. GODFREY.